D. Wellington,
Water Closet.
N° 55,967. Patented June 26, 1866.
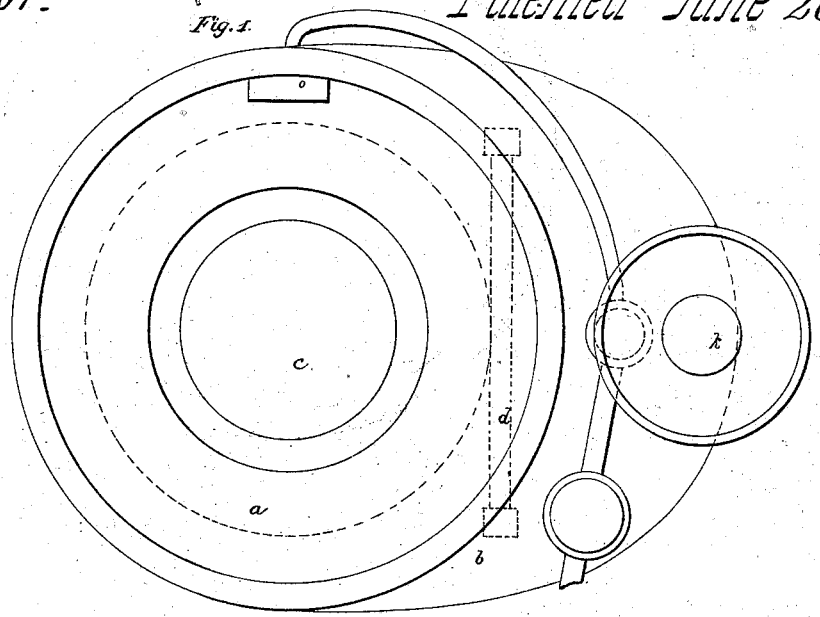
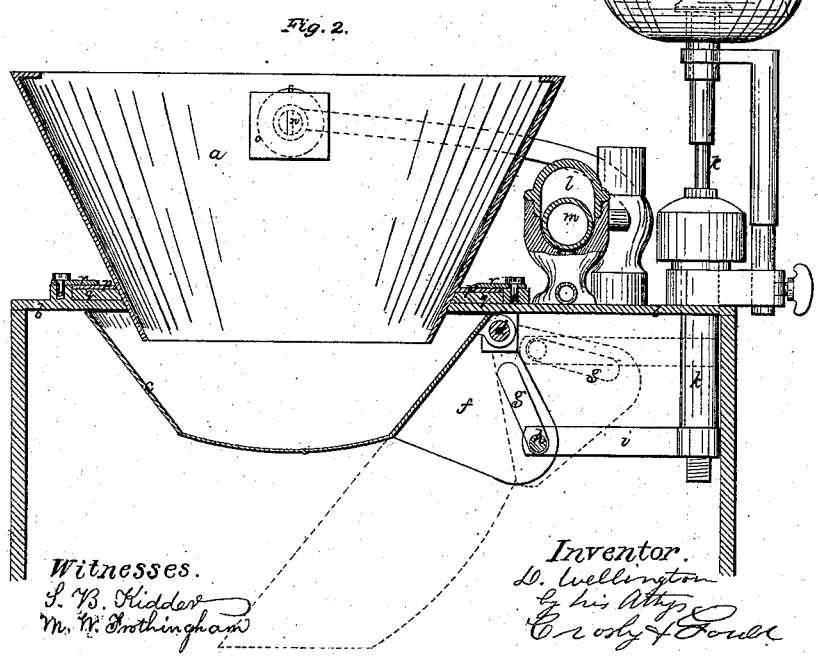
Witnesses.
S. B. Kidder
M. W. Frothingham
Inventor.
D. Wellington
By his Attys
Crosby & Foull

UNITED STATES PATENT OFFICE.

DARIUS WELLINGTON, OF BOSTON, MASSACHUSETTS, ASSIGNOR TO CORNELIUS WELLINGTON, OF SAME PLACE.

IMPROVEMENT IN WATER-CLOSETS.

Specification forming part of Letters Patent No. 55,967, dated June 26, 1866.

*To all whom it may concern:*

Be it known that I, DARIUS WELLINGTON, of Boston, in the county of Suffolk and State of Massachusetts, have invented an Improved Water-Closet; and I do hereby declare that the following, taken in connection with the drawings which accompany and form part of this specification, is a description of my invention sufficient to enable those skilled in the art to practice it.

The invention relates to the construction of that class of water-closets known as "pan-closets," and particularly to the manner of hanging and operating the pan, so as to secure a simplification in the arrangement of the parts, and to prevent the pan from breaking down.

I will first describe the construction of the closet, and will then particularize the peculiarities of construction constituting the invention.

The main drawings represent respectively a plan and a vertical section of a closet embodying my improvements.

*a* denotes the hopper, mounted on a stand, *b*, and having beneath it the pan *c*. As the pan is generally arranged it is hung upon a rocker shaft or shafts extending through the stand, directly in line with or under the hopper. This arrangement is objectionable, because it allows the foul gases to escape up through the bearings, and to remedy this I hang the pan upon a shaft, *d*, extending entirely across and on one side of the pan and on bearings extending down from the top plate of the stand, as seen in Fig. 2.

The pan has an extension, *f*, which has an incline slot, *g*, cut through it, into which a pin, *h*, on an arm, *i*, enters, said arm projecting from the vertical rod *k*, by which the pan is operated. This rod is weighted, and the weight holds the pan closed, as seen in Fig. 2, (the pan and hopper being sealed by the water in the pan,) and the formation of the incline *g*, or its degree of inclination, is such that no weight brought to bear upon the pan can cause the rod to rise or the pan to tip away from the hopper, while by raising the rod the pan is allowed to swing on its shaft into the position denoted by the lines in red, the raising of the pin allowing the incline to slide laterally thereupon, as will be readily understood. Upon release of the rod its weight causes the pin to act upon the incline and force back the pan to its normal position. It will be observed that the position of the pin with respect to the incline when the pan is closed prevents any further rise of the pan.

The water-supply valve is opened by rise of the rod by mechanism not shown, as it forms no part of this invention. Connected with this supply-pipe, however, is a chamber, *l*, opening freely from the pipe, and this chamber contains a flexible air chamber, ball, or globe, *m*, the air in which is compressed by the pressure of the water into the chamber *l*, and when the valve is closed the elasticity of the air gradually forces the water from the chamber *l*, preventing water-hammering and serving to seal the pan. The supply-pipe enters the hopper at the front side thereof, and the opening or nozzle is divided by a cross-plate, *n*, as seen at A, which is a horizontal section of the pipe at its entrance into the hopper, so that the water, as it strikes the plate *o*, debouches into the hopper and around its sides in two currents and in opposite directions, the opposite currents meeting at the back of the hopper and washing down all excremental or fecal matter there deposited.

In the common method of applying the hopper to the stand, the flange *p* is puttied or cemented down upon its seat. This joint is constantly breaking open, causing great annoyance and trouble. To obviate this I insert a rubber or elastic ring, *q*, between the flange and the stand, and key the flange down tightly thereon by buttons *r*. This makes an impervious joint through which gases will not escape, and it is not necessary to have a plumber to apply the hopper, as when the same is cemented in position.

By constructing the pan with the extension *f*, having the incline by which the pan is operated, instead of applying the incline plate at the end of the shaft *d*, all danger of the pan breaking down upon the shaft is obviated, as will be readily understood. By combining with the supply-cock or water-controlling device, and with the air-chamber *l*, the flexible chamber *m*, the sealing of the pan is rendered more effective, as after the pan is closed the expansion of the flexible air-chamber drives the water into the hopper and seals the pan.

Having thus described the construction and operation of the closet, the improvements may be set forth as consisting in placing the incline $g$, by which the pan is operated, in a plate, $f$, which extends directly from the pan itself; also, in the employment, in connection with the supply-pipe, of the flexible air-chamber, in the manner of discharging the water into the hopper, in the manner of connecting the hopper to the stand, and in the manner of connecting the supply-pipe and hopper, a connecting nut or coupling having a flange, $s$, abutting against the inner surface of the hopper, and a tube-projection, $t$, extending through a hole made in the hopper, this projection having a screw-thread cut on it, upon which the end of the pipe is screwed, a leather or other washer, $u$, being interposed between the outer surface of the hopper and the end of the pipe.

In the common construction a short pipe is made integral with and projecting from the hopper, and the supply-pipe is puttied thereto, requiring the services of a plumber; but with this coupling-connection the supply-pipe is readily and imperviously connected by any ordinary skill.

I claim—

1. The arrangement of the shaft $d$, slotted plate $f$, arm $i$, and rod $k$, for supporting the pan by the connection between it and the operating-rod, substantially as described.

2. Combining with the supply-pipe and pan, the flexible air ball or chamber operating to seal the pan, substantially as set forth.

3. In combination with the hopper $a$, the divided nozzle and plate $o$, operating as and for the purpose described.

4. The combination of the ring (serving as an elastic packing) with the flange $p$ and stand $b$, substantially as described.

5. Connecting the supply-pipe to the hopper by means of the flanged coupling $t$, the nut or screw in the supply-pipe, and the interposed packing $u$, arranged and operating substantially as shown and described.

DARIUS WELLINGTON.

Witnesses:
F. GOULD,
J. B. CROSBY.